Figure 1:
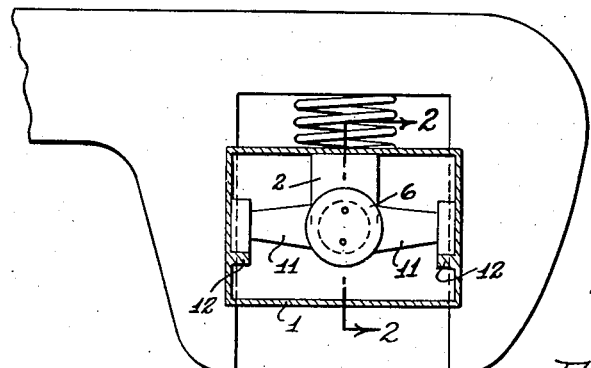

Sept. 3, 1940.    E. H. PIRON    2,213,369
THRUST BEARING
Filed July 19, 1937

EMIL H. PIRON
INVENTOR.

BY
ATTORNEY.

Patented Sept. 3, 1940

2,213,369

UNITED STATES PATENT OFFICE 2,213,369

THRUST BEARING

Emil H. Piron, New York, N. Y. assignor to Transit Research Corporation, New York, N. Y., a corporation of New York Application July 19, 1937, Serial No. 154,413

5 Claims. (Cl. 308—41)

This invention relates to the journal box and axle assemblies of rail cars and has for its object to provide an improved assembly of this type including thrust bearings movable with their axle against a resilient means whereby the axle and the thrust bearing will be returned to normal position subsequent to an axial displacement thereof.

Plain bearings are in almost universal use on rail cars. A major disadvantage of plain bearings results from the fact that the movement of the axles which they permit is unrestrained between limiting stops and that the extent of movement changes continuously as wear occurs.

It is therefore an object of the invention to resiliently restrain axial movement in such a way that the degree of restraint imposed is a function of like degree of axial displacement.

It is also an object of this invention to provide a thrust bearing for each end of an axle in combination with means for supporting the bearings in such manner that they will automatically adjust themselves to changing positions of the center of their axle and which will not lose their proper operative position with respect to the axle even after substantial wear of the journal bearing or of the thrust bearing or both.

More particularly it is an object of the invention to provide a thrust bearing for each end of an axle in combination with an elastic means interposed between the bearing and a wall of the journal box, the elastic means yieldingly resisting endwise movements of the axle in compression or shear and allowing the thrust bearing to adjust itself to displacement of the axle center, preferably by movements in shear.

A further object is to provide an elastic means as above described in the form of an elastic element which is surface bonded at parallel faces to plates of metal, these plates being adapted to be removably fastened to the thrust bearing and journal box wall, respectively, whereby the bearing may be readily inspected or replaced if necessary, this arrangement also having the advantage that it does not interfere with inspection, servicing and replacement of the journal bearing.

A further object of the invention is to provide a thrust bearing and an elastic backing therefor together with means for precluding overstressing of the elastic element by undue rotational forces which might possibly be set up by rotation of the axle in the bearing and consequent tendency of the bearing to rotate with the axle. This is accomplished by providing stops fixedly mounted in the journal box and between which the thrust bearing itself or a suitable member of the thrust bearing assembly resides.

Figure 2:
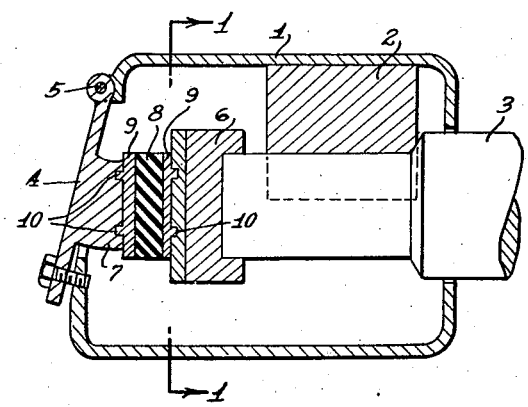
Figure 3:
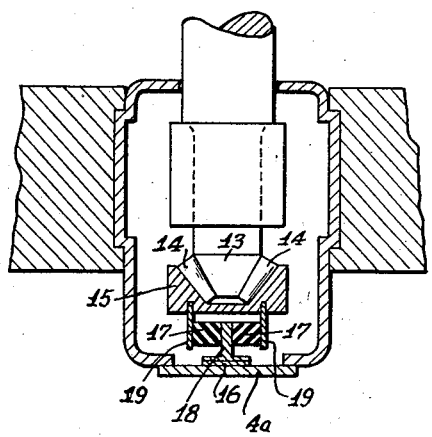

Other objects and advantages will hereinafter become more apparent as reference is had to the accompanying drawing wherein:

Fig. 1 is a side elevation of a rail car pedestal and journal box with the journal box shown in section as indicated by the line 1—1 of Fig. 2 to reveal the enclosed thrust bearing, Fig. 2 is a vertical section taken along the line 2—2 of Fig. 1 showing my invention installed, and Fig. 3 is a horizontal section through a journal box showing a modified form of my invention.

More particularly, 1 indicates a journal box having a journal bearing 2 located therein for support on an axle 3.

A door 4 is pivotally mounted on the journal box at 5 and generally slopes toward the body of the car supported on the axle 3. The construction thus far described is of conventional type although it may be of any type wherein the axle is capable of axial sliding movements either in or with its bearing. The axle illustrated is slidable axially with respect to the bearing 2, and in some instances the bearing 2 is slidable with respect to the top of the journal box.

The axial sliding of the axle is customarily unrestrained. In order to resiliently restrain these sliding movements a thrust bearing 6 is provided, preferably at each end of the axle, a boss 7 is secured to or formed integral with the inside of the door, and a resilient spring composed of an elastic cushion 8 surface bonded to parallel metallic plates 9 is interposed between the end of the thrust bearing 6 and the boss 7. The plates 9 are, preferably, connected to their respective members by dowels 10 in such manner that when the door 4 is opened the spring may be removed. The dowels 10 are shown as formed integral with the plates 9 and as extending into suitable holes in the bearing 6 and boss 7 respectively. The dowels are loose in the holes and are retained therein by compression of the elastic cushion 8 between the door 4 and the thrust bearing. With this arrangement, the thrust bearing 6 may be readily removed also so that the journal bearing 2 may be inspected, serviced or re-placed as is conventionally done.

In order to relieve the elastic element 8 of torsional forces such as would be occasioned when the thrust bearing attempted to rotate with the axle, I recommend that the bearing 6 be provided with one or more arms 11 for engagement with one or more stops 12.

The elastic element, as described, resists axial sliding of the axle in compression. As the journal bearing 2 wears, the axis of the axle moves upwardly with respect to the journal box thereby imposing shear stresses of small amounts in the element 8, which are of no material consequence to subsequent operation or to the life of the element.

In Fig. 3 the journal box 1a has a journal bearing 2a, an axle 3a, and a door 4a which may be identical with the corresponding parts shown in Fig. 1 except that the axle is illustrated coned at its outer end 13 for residence against tapered roller bearings 14 carried by a thrust bearing race 15. The door 4a has a boss 16 and a spring is interposed between the boss and the bearing member 15. This spring is composed of two elastic elements 17, each surface bonded at one face to opposite sides of a flat metallic plate 18 and at their opposite parallel faces to two parallel plates 19. The plates 19 extend in one direction substantially beyond the elements 17 and are attached to the bearing member 15, and the plate 18 extends outwardly beyond the elements 17 in the opposite directions for attachment to the boss 16.

In this case, the elements 17 oppose axial sliding movements of the axle in shear. They also oppose vertical displacement of the axle with respect to the journal box in shear. Since the rotative forces caused by a possible attempt of the race 15 to follow the axle is resisted by the elements 17 largely in compression no stops equivalent to the stops 11 of Fig. 1 are deemed necessary.

In both cases, it is recommended that the elastic elements be so placed that they will not be immersed in the lubricant expected to be carried by the journal box. The lubricant should be maintained at a depth such that a small portion of the axle is always submerged in it. Since the elastic elements are in an oily atmosphere it is recommended that an oil resistant rubber substitute be employed instead of rubber for the elements 8 and 17.

What is claimed is:

1. The combination of an axle, a journal bearing for said axle and in which said axle is capable of axial sliding movements, a journal box for said bearing, a thrust bearing having a flanged perimeter for engagement with the peripheral surface of the end of said axle, said journal box having a hinged door, an elastic pad between said thrust bearing and the door of the box adapted to resist such movements by compression, and means for holding said door in a position maintaining said elastic pad in compression, the axis of said axle being laterally displaceable with wear of said journal bearing, said pad resisting movement of said thrust bearing in following such displacement in shear.

2. The combination of an axle, a journal bearing for one end of said axle and with which said axle is capable of relative axial movements, a thrust bearing on the end of said axle and movable with said axle during such movements, and elastic means yieldingly resisting such movements of the axle and thrust bearing, said elastic means comprising an elastic mass having a plate surface bonded to one end thereof, and coacting means on said plate and thrust bearing maintained operative by compression of said mass for preventing relative displacement of the elastic means and thrust bearing.

3. The combination of an axle, a journal bearing for one end of said axle and with which said axle is capable of relative axial movements, a thrust bearing on the end of said axle and movable with said axle during such movements, and elastic means yieldingly resisting such movements of the axle and thrust bearing, solely by compression, said elastic means comprising an elastic mass having a plate surface bonded to one end thereof, and coacting means on said plate and thrust bearing maintained operative by compression of said mass for preventing relative displacement of the elastic means and thrust bearing.

4. The combination of an axle, a journal bearing for one end of said axle in which said axle is capable of axial sliding movements, a journal box for said bearing, a thrust bearing fitting said end of said axle, said journal box having a movable door, elastic means interposed between the thrust bearing and said door for resisting axial movement of said axle, said elastic means comprising an elastic mass having a plate surface bonded thereto, coacting means on said plate and thrust bearing maintained operative by compression of said mass for preventing relative displacement of the elastic means and thrust bearings, and means holding said door in a position maintaining said elastic mass in compression.

5. The combination of an axle, a journal bearing for one end of said axle in which said axle is capable of axial sliding movements, a journal box for said bearing, a thrust bearing fitting said end of said axle, said journal box having a movable door, elastic means interposed between the thrust bearing and said door for resisting axial movement of said axle, said elastic means comprising an elastic mass having a plate surface bonded thereto, coacting means on said plate and thrust bearing maintained operative by compression of said mass for preventing relative displacement of the elastic means and thrust bearings, a second plate surface bonded to the other end of said elastic mass, coacting means on said second plate and said door maintained operative by compression of said mass for preventing relative displacement of the elastic means and door, and means holding said door in a position maintaining said elastic mass in compression.

EMIL H. PIRON.